United States Patent
Balasubramaniam et al.

(10) Patent No.: US 12,432,611 B2
(45) Date of Patent: Sep. 30, 2025

(54) METHOD TO SUPPORT MOBILE TERMINATED SMALL DATA TRANSMISSION IN RADIO RESOURCE CONTROL INACTIVE STATE

(71) Applicant: Nokia Technologies Oy, Espoo (FI)

(72) Inventors: Sankaran Balasubramaniam, Bangalore (IN); Ethiraj Alwar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 328 days.

(21) Appl. No.: 18/359,131

(22) Filed: Jul. 26, 2023

(65) Prior Publication Data

US 2024/0114381 A1    Apr. 4, 2024

(30) Foreign Application Priority Data

Sep. 30, 2022 (IN) .............................. 202241056198

(51) Int. Cl.
*H04W 28/02* (2009.01)
*H04W 68/02* (2009.01)
*H04W 76/30* (2018.01)

(52) U.S. Cl.
CPC ....... *H04W 28/0268* (2013.01); *H04W 68/02* (2013.01); *H04W 76/30* (2018.02)

(58) Field of Classification Search
CPC . H04W 28/0268; H04W 68/02; H04W 76/30; H04W 76/27
See application file for complete search history.

(56) References Cited

U.S. PATENT DOCUMENTS

| | | | |
|---|---|---|---|
| 11,382,137 B2 | 7/2022 | Hoglund et al. | |
| 2022/0132600 A1 | 4/2022 | Kim et al. | |
| 2024/0196444 A1* | 6/2024 | Shah | H04W 76/27 |
| 2024/0373497 A1* | 11/2024 | Dai | H04W 28/0273 |

FOREIGN PATENT DOCUMENTS

| | | |
|---|---|---|
| WO | 2022/027042 A1 | 2/2022 |
| WO | 2022/066888 A1 | 3/2022 |
| WO | 2022/160077 A1 | 8/2022 |

OTHER PUBLICATIONS

"3rd Generation Parinership Project; Technical Specification Group Radio Access Network; NR; Medium Access Control (MAC) protocol specification (Release 17)", 3GPP TS 38.321, V17.1.0, Jun. 2022, pp. 1-241.

"3rd Generation Partnership Project; Technical Specification Group Radio Access Network; NR; User Equipment (UE) procedures in ldle mode and RRC Inactive state (Release 17)", 3GPP TS 38.304, V17.1.0, Jun. 2022, pp. 1-50.

(Continued)

*Primary Examiner* — Charles C Jiang
*Assistant Examiner* — Rachel Elizabeth Marks
(74) *Attorney, Agent, or Firm* — Nokia Technologies Oy

(57) ABSTRACT

In accordance with example embodiments of the invention there is at least a method enabling a message 4 from a network node distributed unit to a small data transmission user equipment to include information of both small data payload and a radio resource control release.

14 Claims, 4 Drawing Sheets

(56) References Cited

OTHER PUBLICATIONS

"3rd Generation Partnership Project; Technical Specification Group Radio Access Network; NG-RAN; F1 application protocol (F1AP) (Release 17)", 3GPP TS 38.473, V17.1.0, Jun. 2022, pp. 1-667.

"New WI: Mobile Terminated-Small Data Transmission (MT-SDT) for NR", 3GPP TSG RAN Meeting #94e, RP-213583, Agenda: 8.6.2, ZTE Corporation, Dec. 6-17, 2021, 5 pages.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"Motivation for Rel-18 SDT WI", 3GPP TSG RAN Meeting #94e, RP-213403, Agenda: 8A.2, ZTE Corporation, Dec. 6-17, 2021, 4 pages.

"New WID on MT-SDT", 3GPP TSG RAN Meeting #94, RP-212686, Agenda: 8.A1, RAN2 VC, Dec. 6-17, 2021, 4 pages.

* cited by examiner

METHOD TO SUPPORT MOBILE TERMINATED SMALL DATA TRANSMISSION IN RADIO RESOURCE CONTROL INACTIVE STATE

RELATED APPLICATION

This application was originally filed as a provisional Indian Patent Application No. 202241056198, on 30 Sep. 2022, which is hereby incorporated in its entirety.

TECHNICAL FIELD

The teachings in accordance with the exemplary embodiments of this invention relate generally to supporting mobile terminated small data transmission and, more specifically, relate to providing enhanced signalling for supporting mobile terminated small data transmission procedures in a radio resource control inactive state.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- gNB-DU gNB Distributed Unit
- gNB-CU-CP gNB Central Unit-Control Plane
- gNB-CU-UP gNB Central Unit-User Plane
- MT-SDT Mobile Terminated Small Data Transmission
- MO-SDT Mobile Originated Small Data Transmission
- QFI QoS Flow ID
- LTE Long Term Evolution
- EDT Early Data Transmission
- NR New Radio
- SDT Small Data Transmission 3gpp standards have specified MO SDT (Mobile Originated Small Data Transmission) which enables the Transmission of small data packets from RRC-INACTIVE without transition to RRC Connected state. This enables Energy consumption reduction due to avoidance of signalling overhead for RRC connection establishment.

Example embodiments of the invention work to further improve at least these Mobile Small Data Transmission operations.

SUMMARY

This section contains examples of possible implementations and is not meant to be limiting.

In an example aspect of the invention, there is an apparatus, such as a gNB-CU-CP Side apparatus, comprising: at least one processor; and at least one non-transitory memory including computer program code, where the at least one non-transitory memory and the computer program code are configured, with the at least one processor, to cause the apparatus to at least: receive, by a network node central unit control plane, information comprising an indication of a downlink data notification for a small data transmission, wherein the information comprises a quality of service flow identification for the small data transmission; based on the information, identify that the downlink data notification is for a small data transmission bearer user equipment; based on the identifying, send towards a network node distributed unit associated with the user equipment an application protocol paging message comprising user equipment context setup request information, wherein there is receiving from the user equipment a message 3 comprising a radio resource control resume request, wherein the application protocol paging message causes a context setup for the user equipment as part of radio resource control resume message handling, wherein the user equipment context setup request information comprises an indication of the small data transmission bearer; wherein the quality of service flow identification is mapped to a stored data radio bearer identification to identify it is for small data transmission by the user equipment; and based on the context setup, initiate a radio resource control release using a user equipment context release configuration to release resources that are no longer needed, wherein based on the indication of a small data payload, a message 4 from the network node distributed unit to the small data transmission bearer for the small data transmission user equipment comprises information of both the small data payload and the radio resource control release.

In another example aspect of the invention, there is a method comprising: receiving, by a network node central unit control plane, information comprising an indication of a downlink data notification for a small data transmission, wherein the information comprises a quality of service flow identification for the small data transmission; based on the information, identifying that the downlink data notification is for a small data transmission bearer user equipment; based on the identifying, sending towards a network node distributed unit associated with the user equipment a page and upon receiving the page response, in the form of RRC Resume Request, send an application protocol paging message comprising user equipment context setup request information, wherein there is receiving from the user equipment a message 3 comprising a radio resource control resume request, wherein the application protocol paging message causes a context setup for the user equipment as part of radio resource control resume message handling, wherein the user equipment context setup request information comprises an indication of the small data payload; wherein the quality of service flow identification is mapped to a stored data radio bearer identification to identify it is for small data transmission by the user equipment; and based on the context setup, initiating a radio resource control release using a user equipment context release configuration to release resources that are no longer needed, wherein based on the indication of SDT data from gNB-CU-UP on the small data payload, a message 4 from the network node distributed unit to the small data transmission bearer for the small data transmission user equipment comprises information of both the small data payload and the radio resource control release.

A further example embodiment is an apparatus and a method comprising the apparatus and the method of the previous paragraphs, wherein the user equipment was moved to a radio resource control inactive state by the network node central unit control plane, wherein the information comprising the indication of the downlink data notification is received from a network node central unit user plane of a communication network, wherein the network node central unit control plane is mapping the quality of service flow identification to stored data radio bearer identifications to identify that the downlink data notification is for a small data transmission bearer user equipment, wherein based on identifying that the downlink data notification is for a small data transmission bearer user equipment the application protocol paging message is sent as an alternate to a paging message, and/or wherein the alternate application protocol paging message is based on a decoded radio resource control resume request and user equipment context stored at the apparatus and identifying a small data payload.

A non-transitory computer-readable medium storing program code, the program code executed by at least one processor to perform at least the method as described in the paragraphs above.

In another example aspect of the invention, there is an apparatus comprising: means for receiving, by a network node central unit control plane, information comprising an indication of a downlink data notification for a small data transmission, wherein the information comprises a quality of service flow identification for the small data transmission; means, based on the information, for identifying that the downlink data notification is for a small data transmission bearer user equipment; means, based on the identifying, for sending towards a network node distributed unit associated with the user equipment an application protocol paging message comprising user equipment context setup request information, wherein there is receiving from the user equipment a message 3 comprising a radio resource control resume request, wherein the application protocol paging message causes a context setup for the user equipment as part of radio resource control resume message handling, wherein the user equipment context setup request information comprises an indication of the small data payload; wherein the quality of service flow identification is mapped to a stored data radio bearer identification to identify it is for small data transmission by the user equipment; and means, based on the context setup, for initiating a radio resource control release using a user equipment context release configuration to release resources that are no longer needed, wherein based on the indication of the small data payload, a message 4 from the network node distributed unit to a small data transmission bearer for the small data transmission user equipment comprises information of both the small data payload and the radio resource control release.

In accordance with the example embodiments as described in the paragraph above, at least the means for receiving, identifying, sending, and initiating comprises a network interface, and computer program code stored on a computer-readable medium and executed by at least one processor.

In another example aspect of the invention, there is an apparatus, such as a user equipment side apparatus, comprising: at least one processor; and at least one non-transitory memory including computer program code, where the at least one non-transitory memory and the computer program code are configured, with the at least one processor, to cause the apparatus to at least: receive, by a network node distributed unit from a network node central unit control plane an application protocol paging message comprising user equipment context setup request information, wherein in response to the receiving there is a message 3 from the user equipment comprising a radio resource control resume request, wherein the application protocol paging message causes a context setup for user equipment as part of radio resource control resume message handling, wherein the user equipment context setup request information comprises an indication of a small data payload for a small data transmission bearer user equipment associated with the network node distributed unit, and wherein a radio resource control release using a user equipment context release configuration has released resources that are no longer needed based on the context setup; and based on the indication of the small data payload, send towards the small data transmission bearer user equipment a message 4 for the small data transmission comprising information of both the small data payload and the radio resource control release.

In another example aspect of the invention, there is a method comprising: receiving, by a network node distributed unit from a network node central unit control plane an application protocol paging message comprising user equipment context setup request information, wherein in response to the receiving there is a message 3 from the user equipment comprising a radio resource control resume request, wherein the application protocol paging message causes a context setup for user equipment as part of radio resource control resume message handling, wherein the user equipment context setup request information comprises an indication of a small data payload for a small data transmission bearer user equipment associated with the network node distributed unit, and wherein a radio resource control release using a user equipment context release configuration has released resources that are no longer needed based on the context setup; and based on the indication of the small data payload, sending towards the small data transmission bearer user equipment a message 4 for the small data transmission comprising information of both the small data payload and the radio resource control release.

A further example embodiment is an apparatus and a method comprising the apparatus and the method of the previous paragraphs, wherein the application protocol paging message is received in response to information sent to the network node central unit control plane comprising an indication of a downlink data notification for a small data transmission, wherein based on identifying that the downlink data notification is for the small data transmission bearer user equipment the application protocol paging message is received as an alternate to a paging message, and/or wherein the alternate application protocol paging message is based on a decoded radio resource control resume request and user equipment context stored at the apparatus and identifying the small data payload.

A non-transitory computer-readable medium storing program code, the program code executed by at least one processor to perform at least the method as described in the paragraphs above.

In another example aspect of the invention, there is an apparatus comprising: means for receiving, by a network node distributed unit from a network node central unit control plane an application protocol paging message comprising user equipment context setup request information, wherein in response to the receiving there is a message 3 from the user equipment comprising a radio resource control resume request, wherein the application protocol paging message causes a context setup for user equipment as part of radio resource control resume message handling, wherein the user equipment context setup request information comprises an indication of a small data payload for a small data transmission bearer user equipment associated with the network node distributed unit, and wherein a radio resource control release using a user equipment context release configuration has released resources that are no longer needed based on the context setup; and means, based on the indication of the small data payload, for sending towards the small data transmission bearer user equipment a message 4 for the small data transmission comprising information of both the small data payload and the radio resource control release.

In accordance with the example embodiments as described in the paragraph above, at least the means for receiving, identifying, and sending comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Example embodiments of the invention provide at least a method and apparatus for providing enhanced signalling for supporting mobile terminated small data transmission procedures in a radio resource control inactive state.

As similarly stated above, standards at the time of this application have specified MO SDT (Mobile Originated Small Data Transmission) which enables the Transmission of small data packets from RRC-INACTIVE without transition to RRC Connected state. This enables Energy consumption reduction due to avoidance of signalling overhead for connection establishment.

In addition, for standards a work item for MT SDT (Mobile Terminated Small Data Transmission) which is a mechanism used by Application Function(s) to deliver commands to be executed by the UE. Objective of this work item is to specify MT-SDT triggering for RRC-IDLE and RRC-INACTIVE states. MT-SDT triggering to support initial data transmission followed by consecutive transmission is also considered in this WID.

The main use case associated with MT-SDT triggering is application triggered network commands towards multiple IoT devices. The SDT command is likely to be of small data size.

The following constraints are foreseen to meet this requirement:
1. The normal paging followed by RRC connection for data transmission is not optimal when the number of such devices is large and the amount of data is less. The signalling overhead will be large compared to the amount of actual data to be sent;
2. The standards at the time of this application specify the procedure for MO-SDT, which cannot be reused as is for the MT-SDT signalling. In case of MO-SDT, the data to be sent is in in the UL only and is specified to be added to the Msg3 of RACH signalling. In case of MT-SDT, along with SDT data, RRC Release need to be sent to the UE in the DL; and
3. The MT-SDT data and RRC Release could be sent separately from gNB-DU to the UE, but will result in unnecessary hold up of resources.

Example embodiments of the invention provide a solution for the basic MT-SDT procedure.

The MO-SDT solution In standards at the time of this application doesn't support the MT-SDT use case.

LTE defines MT-EDT, where the MT-EDT message is sent over Msg4. This is the working assumption in NR too, but there is no RRC-INACTIVE state defined in LTE.

Example embodiments of the invention provide enhanced signalling procedures for improving MT SDT message procedures.

Figure 2:
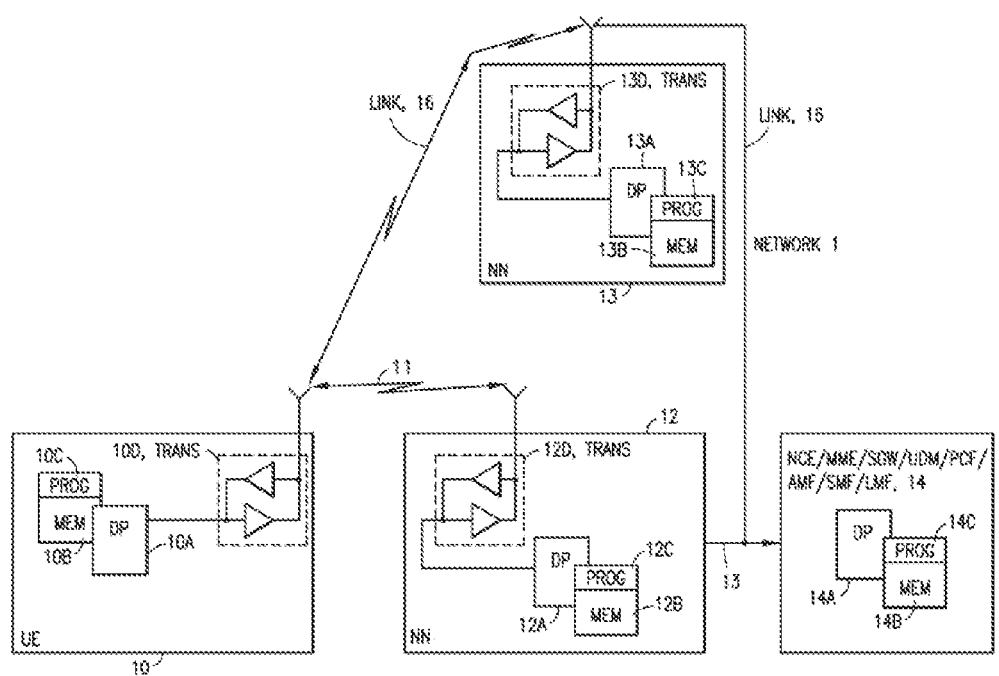
FIG. 2 shows a high level block diagram of various devices used in carrying out various aspects of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1 or network, 1 as in FIG. 2. The wireless network 1 or network 1 as in FIG. 2 can comprise a communication network such as a mobile network e.g., the mobile network 1 or first mobile network as disclosed herein. Any reference herein to a wireless network 1 as in FIG. 2 can be seen as a reference to any wireless network as disclosed herein. Further, the wireless network 1 as in FIG. 2 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signalling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13, respectively. The one or more memories MEM 10B include computer program code PROG 10C. The UE 10 communicates with NN 12 and/or NN 13 via a wireless link 11 or 16.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 16. Further, the link 11, link 16 and/or any other link may be wired or wireless or both and may implement, e.g., an X2 or Xn interface. Further the link 11 and/or link 16 may be through other network devices such as, but not limited to an NCE/MME/SGW/UDM/PCF/AMF/SMF/LMF 14 device as in FIG. 2. The NN 12 may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 13D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or link 16 or another link. The Link 16 as shown in FIG. 2 can be used for communication between the NN 12 and the NN 13. These links may be wired or wireless or both and may implement, e.g., an X2 or Xn interface. Further, as stated above the link 11 and/or link 16 may be through other network devices such as, but not limited to an NCE/MME/SGW device such as the NCE/MME/SGW/UDM/PCF/AMF/SMF/LMF 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and these devices can include one or more buses that could be implemented in part as fiber optic cable to connect the other elements of the NN 12 to a RRH.

It is noted that although FIG. 2 shows a network nodes such as NN 12 and NN 13, any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMF/SMF/LMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management Function (AMF) functionality, and/or Session Management (SMF) functionality, and/or Location Management Function (LMF), and/or Authentication Server (AUSF) functionality and which provides connectivity with a further network, such as a telephone network and/or a data communications network (e.g., the Internet), and which is configured to perform any 5G and/or NR operations in addition to or instead of other standard operations at the time of this application. The NCE/MME/SGW/UDM/PCF/AMF/SMF/LMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMF/SMF/LMF 14.

The NCE/MME/SGW/UDM/PCF/AMF/SMF/LMF 14 includes one or more processors DP 14A, one or more memories MEM 14B, and one or more network interfaces (N/W I/F(s)), interconnected through one or more buses coupled with the link 13 and/or link 16. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMF/SMF/LMF 14 to perform one or more operations which may be needed to support the operations in accordance with the example embodiments of the invention.

It is noted that that the NN 12 and/or NN 13 and/or UE 10 can be configured (e.g. based on standards implementations etc.) to perform functionality of a Location Management Function (LMF). The LMF functionality may be embodied in any of these network devices or other devices associated with these devices. In addition, an LMF such as the LMF of the MME/SGW/UDM/PCF/AMF/SMF/LMF 14 of FIG. 2, as at least described below, can be co-located with UE 10 such as to be separate from the NN 12 and/or NN 13 of FIG. 2 for performing operations in accordance with example embodiments of the invention as disclosed herein.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP 10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP 10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP 10, DP12A, DP13A, and DP14A may be means for performing functions, such as controlling the UE 10, NN 12, NN 13, and other functions as described herein.

In general, various embodiments of any of these devices can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of any of these devices can be used with a UE vehicle, a High Altitude Platform Station, or any other such type node associated with a terrestrial network or any drone type radio or a radio in aircraft or other airborne vehicle.

As similarly stated above, example embodiments of the invention provide enhanced signalling for improving MT SDT message procedures—the following are some key enhancements proposed in accordance with example embodiments of the invention:

1. gNB-CU-CP identifies that a given E1AP: DL Data Notification is for an SDT bearer;
2. It then initiates the paging for MT-SDT in the F1AP: Paging message to gNB-DU;
3. The F1AP:UE Context Setup is done as part of the RRC Resume message handling to establish the DL F1-U tunnel. In accordance with example embodiments of the invention, as part of the UE context setup, the gNB-CU-CP indicates that this page is for MT-SDT data;
4. Once the UE context is established, gNB-CU-CP initiates the UE context release with RRC Release;
5. Independently, gNB-CU-UP sends the MT-SDT data over F1-U; and
6. In accordance with example embodiments of the invention, gNB-DU consolidates both the RRC Release and MT-SDT and sends them together simultaneously over Msg4 (in accordance with example embodiments of the invention, based on the indication got in UE Context Setup Req). This ensures that radio resources are not held unnecessarily.

Example embodiments of the invention are related to gNB and UE. The crystallization of this invention is to carry mobile terminated small data transmission (MT-SDT) as part of the (downlink) RRC Release message. This invention is proposing the basic procedure for the MT-SDT scenarios, and this procedure shall enable all 5G IoT devices to receive SDT commands without moving out of RRC-INACTIVE state. MT-SDT is a key mechanism to enable the IIoT use case of 5G, which will be used for multiple vertical industries. 3gpp Rel-17 has specified MO SDT (Mobile Originated Small Data Transmission) which enables the Transmission of small data packets from RRC-INACTIVE without transition to RRC Connected state. This enables Energy consumption reduction due to avoidance of signalling overhead for connection establishment. 3gpp Rel-18 has work item for MT SDT (Mobile Terminated Small Data Transmission) RP-213583 which is a mechanism used by Application Function(s) to deliver commands to be executed by the UE. Objective of this work item is to specify MT-SDT triggering for RRC-IDLE and RRC-INACTIVE states. MT-SDT triggering to support initial data transmission followed by consecutive transmission is also considered in this WID. The impacts identified in protocols like F1AP & L2(MAC) shall indicate if this solution has been implemented or not. The impacts are in the gNB and UE.

One main use case associated with MT-SDT triggering is application triggered network commands towards multiple IoT devices. The SDT command is likely to be of small data size. The following constraints are foreseen to meet this requirement: (i) The normal paging followed by RRC connection for data transmission is not optimal when the number of such devices is large and the amount of data is less. The signalling overhead will be large compared to the amount of actual data to be sent. (ii) The R17 standards specify the procedure for MO-SDT, which cannot be reused as is for the MT-SDT signaling. In case of MO-SDT, the data to be sent is in in the UL only and is specified to be added to the Msg3 of RACH signaling. In case of MT-SDT, along with SDT data, RRC Release need to be sent to the UE in the DL. (iii) The MT-SDT data and RRC Release could be sent separately from gNB-DU to the UE, but will result in unnecessary hold up of resources and that's why proposing a solution for the basic MT-SDT procedure in this IR.

Example embodiments of the invention propose the basic signaling procedure for supporting MT SDT messages—the following are the key enhancements proposed: (i) gNB-CU-CP identifies that a given E1AP: DL Data Notification is for an SDT bearer. (ii) It then initiates the paging for MT-SDT in the F1AP:Paging message to gNB-DU. (iii) The F1AP: UE Context Setup is done as part of the RRC Resume message handling to establish the DL F1-U tunnel. As part of the UE context setup, the gNB-CU-CP indicates that this page is for MT-SDT data. (iv) Once the UE context is established, gNB-CU-CP initiates the UE context release with RRC Release. (v) Independently, gNB-CU-UP sends the MT-SDT data over F1-U. (vi) gNB-DU consolidates both the RRC Release and MT-SDT and sends them together simultaneously over Msg4 (UPDATE: based on the indication got in UE Context Setup Req). This ensures that radio resources are not held unnecessarily.

Figure 1:
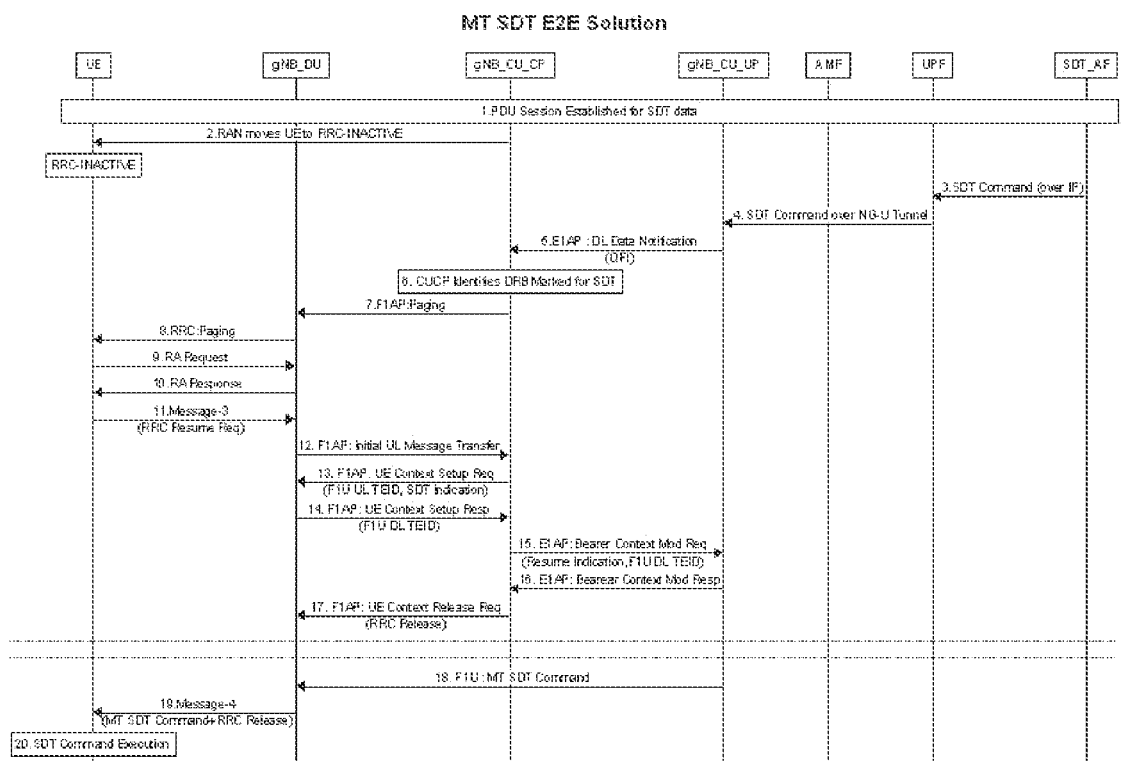
FIG. 1 shows a mobile terminated small data transmission solution in accordance with example embodiments of the invention.

FIG. 1: MT-SDT Basic Solution

FIG. 1 shows a mobile terminated small data transmission solution in accordance with example embodiments of the invention The following are the key steps as in FIG. 1 in the overall call flow in accordance with example embodiments of the invention:

Steps 1-4: SDT UE is moved to RRC-INACTIVE—it then gets the MT-SDT Command data at gNB-CU-UP;

Step 5: gNB-CU-UP indicates the same with a notification to gNB-CU-CP including the QFIs on which the data has come;

Step 6: In accordance with example embodiments of the invention, gNB-CU-CP then maps the QFIs to the stored DRB IDs and identifies that it is for SDT data [New gNB-CU-CP implementation impact in accordance with example embodiments of the invention];

Step 7: In accordance with example embodiments of the invention, it indicates this using a new IE in the F1AP: Paging message [New F1AP impact in accordance with example embodiments of the invention];

Steps 8-11: The paging and RACH procedures are started—UE sends RRC Resume Req as part of Msg3;

Steps 12-16: This results in the F1AP:UE context establishment & E1AP: Bearer context modification to setup the F1-U TEIDs. In accordance with example embodiments of the invention, the F1AP:UE Context Setup Request has an indication for SDT. [New Impact—3GPP in accordance with example embodiments of the invention];

Step 17: gNB-CU-CP initiates the RRC Release using F1:UE Context Release (Suspend Config) to release the resources [New Impact—gNB-DU implementation in accordance with example embodiments of the invention];

Step 18: gNB-CU-UP sends the MT-SDT Command to gNB-DU;

Note: Steps 17 and 18 shall be independent and asynchronous (triggered by gNB-CU-CP and gNB-CU-UP respectively);

Step 19: gNB-DU shall consolidate both the RRC Release and MT-SDT Data and send in Msg4;

In accordance with example embodiments of the invention, this consolidation is based on the SDT indication got in Step 12. [New L2 impact—Standards-Msg4 definition & L2 implementation in accordance with example embodiments of the invention];

Step 20: UE executes the SDT command;

Step 21: UE handles the RRC Release message;

Note: On the UE side, it is assumed that the MT-SDT command is first executed and then the RRC Release is handled. In accordance with example embodiments of the invention] if the order is changed, the SDT command may be ignored. [Idle handling spec-38.304 possible impacts+UE implementation impacts in accordance with example embodiments of the invention]

Based on the above description, the following are some key embodiments in accordance with example embodiments of the invention:

Method 1: gNB-CU-CP identifying that the DL data notification is for an SDT device [Step 6 as in FIG. 1];

Method 2: New IE in F1AP:UE Context Setup Request message to indicate that the page is for MT-SDT command [Step 7 as in FIG. 1];

Method 3: gNB-CU-CP to initiate UE Context Release immediately after UE Context Setup is completed [Step 17 as in FIG. 1];

Method 4: L2 Msg4 definition enhanced to show that MT-SDT data and RRC Release can be sent together [Step 19 as in FIG. 1]; and Method 5: UE handling MT-SDT command part of Msg4 before the RRC Release handling [Steps 20 as in FIG. 1]

In addition, in accordance with example embodiments of the invention the following are some main aspects of the modified solution:

Adding the SDT indication in the F1AP:UE Context Setup Request instead of the Paging message;

This will be sent only to the DU that hosts the UE (where serving cell is there)—reduced F1AP traffic as compared to sending in Paging message, which is sent to all the DUs;

CUCP shall set this based on decoded RRC Resume Req+UE context stored to identify that this is an SDT bearer—no decoding in DU needed (which will be required if the IE is in F1AP: Paging);

DU shall wait for the UE Context Release with the RRC container (RRC Release) till it gets SDT CMD (MT-SDT) over F1-U and then sends it together in the Msg4;

This is also a logical extension to the MO-SDT solution already defined in standards at the time of this application (unlike the prior art); and This solution has no commonality with any of prior arts listed.

It is noted that to add the SDT indication in the F1AP:UE Context Setup Request instead of the Paging message. (ii) This will be sent only to the DU that hosts the UE (where serving cell is there)—reduced FLAP traffic as compared to sending in Paging message, which is sent to all the DUs. (iii) CUCP shall set this based on decoded RRC Resume Req+ UE context stored—to identify that this is an SDT bearer— no decoding in DU needed (which will be required if the IE is in FLAP: Paging). (iv) DU shall wait for the UE Context Release with the RRC container (RRC Release) till it gets SDT CMD (MT-SDT) over F1-U and then sends it together in the Msg4. (v) This is also a logical extension to the MO-SDT solution already defined in R17.

Furthermore, in accordance with example embodiments of the invention the RRC Release from CUCP and the MT SDT data from CUUP can be asynchronous and may come in any order. However, these have to go together in the Msg4. Therefore, in accordance with example embodiments of the invention one key novelty or new requirement here is for the DU to wait for both, consolidate and send them together in Msg4. The SDT indication in the UE Context Setup Req explicitly asks the DU to take care of this combined delivery.

It is noted that it can be assumed that the UE, when it gets the SDT payload+RRC Release, first handles the SDT payload then then RRC Release. Otherwise, the UE will go to RRC Idle state and may not handle the command coming in the SDT payload.

Novel features in accordance with example embodiments of the invention as described herein include at least that an SDT UE is moved to RRC-INACTIVE then it gets the MT-SDT Command data at gNB-CU-UP; a gNB-CU-CP then maps the QFIs to the stored DRB IDs and identifies that it belongs to an SDT UE and in turn has to enable the MT-SDT related enhancements; the paging and RACH procedures are started, and UE sends RRC Resume Request as part of Msg3. (d) gNB-CU-CP send E1AP and Bearer context modification to setup the F1-U TEIDs to gNB-CU-UP. (e) UE executes the SDT command; and the UE handling MT-SDT command part of Msg4 before the RRC Release handling, where if the order is changed, the SDT command may be ignored.

Figure 3A:
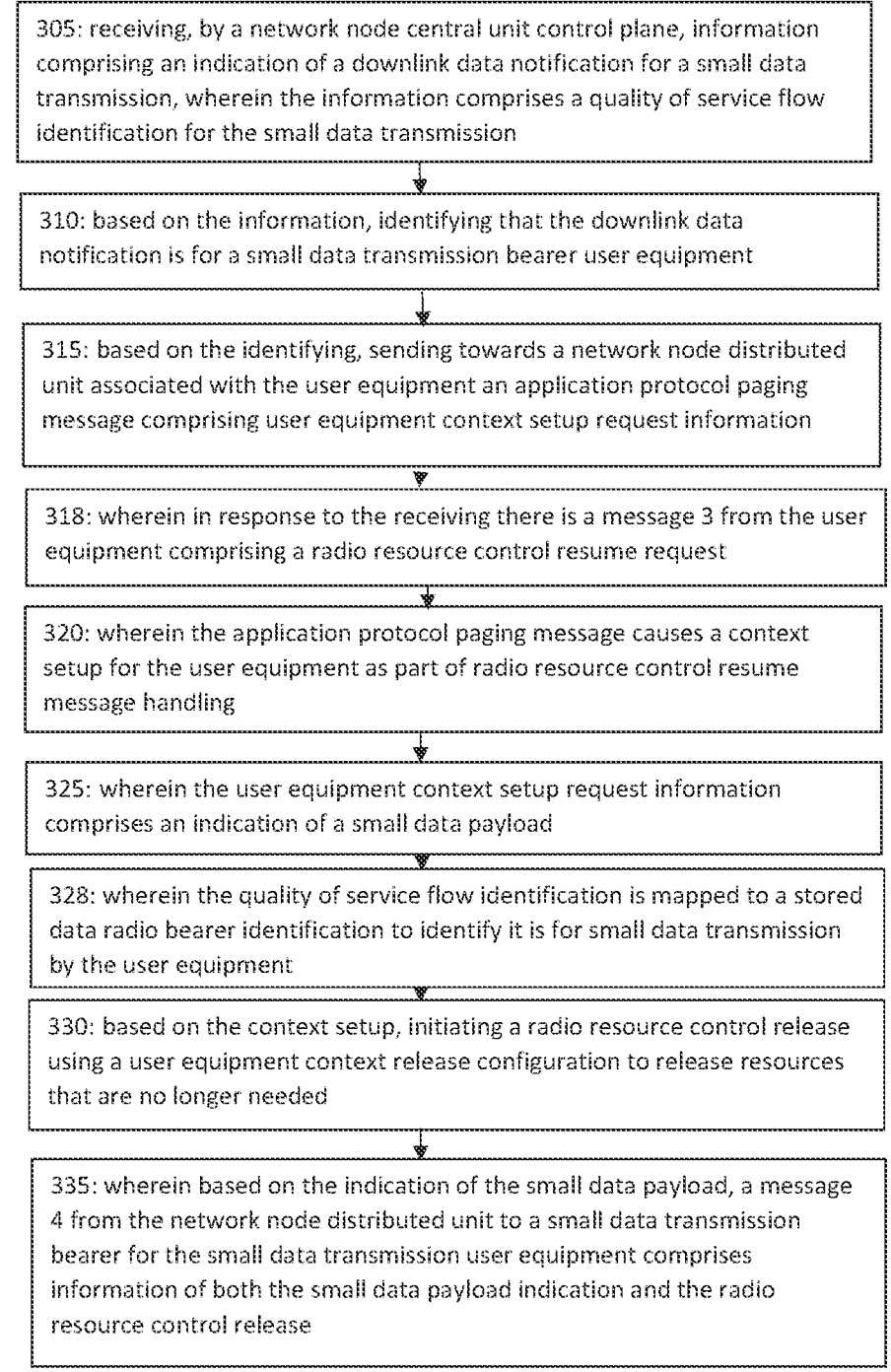
FIG. 3A and FIG. 3B each shows a method in accordance with example embodiments of the invention which may be performed by an apparatus.
Figure 3B:
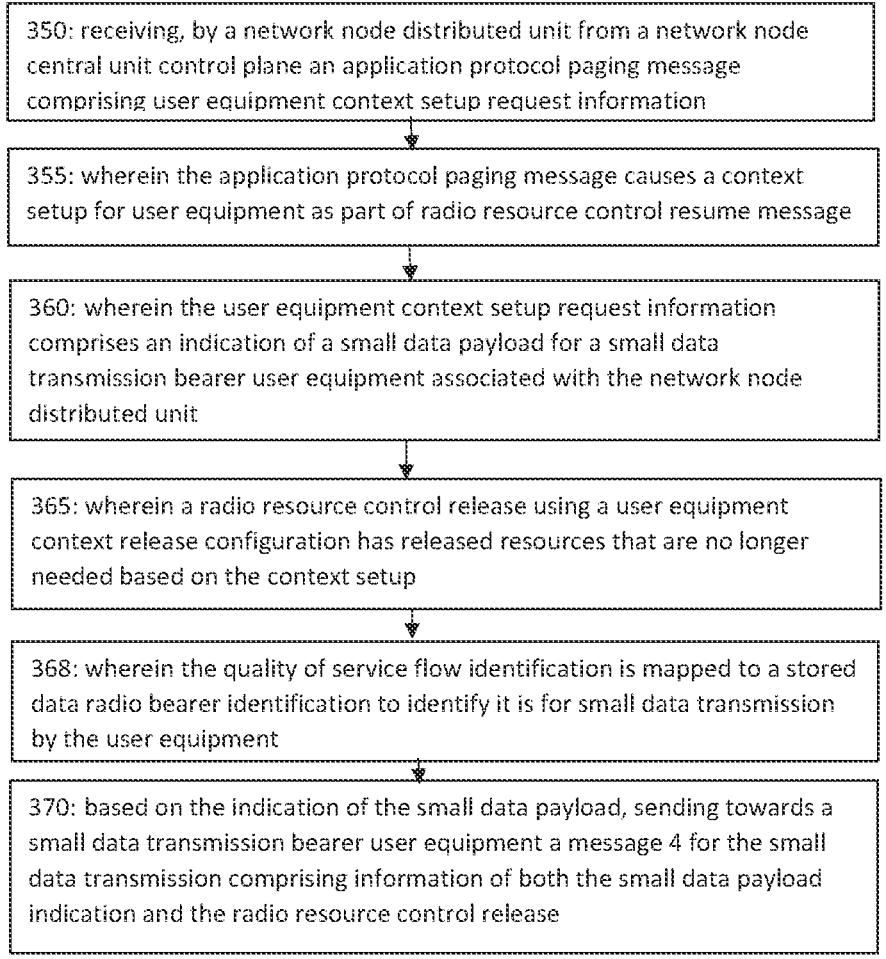

FIG. 3A and FIG. 3B each shows a method in accordance with example embodiments of the invention which may be performed by an apparatus.

FIG. 3A illustrates operations which may be performed by a network device such as, but not limited to, a network node NN 12 and/or NN 13 as in FIG. 2 or a network node central unit control plane or an eNB or gNB. As shown in step 305 of FIG. 3A there is receiving, by a network node central unit control plane, information comprising an indication of a downlink data notification for a small data transmission, wherein the information comprises a quality of service flow identification for the small data transmission. As shown in step 310 of FIG. 3A there is, based on the information, identifying that the downlink data notification is for a small data transmission bearer user equipment. As shown in step 315 of FIG. 3A there is, based on the identifying, sending towards a network node distributed unit associated with the user equipment an application protocol paging message comprising user equipment context setup request information. As shown in step 318 of FIG. 3A wherein there is receiving from the user equipment a message 3 comprising a radio resource control resume request. As shown in step 320 of FIG. 3A, wherein the application protocol paging message causes a context setup for the user equipment as part of radio resource control resume message handling. As shown in step 325 of FIG. 3A, wherein the user equipment context setup request information comprises an indication of the small data payload. As shown in step 328 of FIG. 3A wherein the quality of service flow identification is mapped to a stored data radio bearer identification to identify it is for small data transmission by the user equipment. As shown in step 330 of FIG. 3A there is based on the context setup, initiating a radio resource control release using a user equipment context release configuration to release resources that are no longer needed. Then as shown in step 335 of FIG. 3A, wherein based on the indication of the small data payload, a message 4 from the network node distributed unit to the small data transmission bearer for the small data transmission user equipment comprises information of both the small data payload and the radio resource control release.

In accordance with the example embodiments as described in the paragraph above, wherein the user equipment was moved to a radio resource control inactive state by the network node central unit control plane.

In accordance with the example embodiments as described in the paragraphs above, wherein the information comprising the indication of the downlink data notification is received from a network node central unit user plane of a communication network.

In accordance with the example embodiments as described in the paragraphs above, wherein the network node central unit control plane is mapping the quality of service flow identification to stored data radio bearer identifications to identify that the downlink data notification is for a small data transmission bearer user equipment.

In accordance with the example embodiments as described in the paragraphs above, wherein based on identifying that the downlink data notification is for a small data transmission bearer user equipment the application protocol paging message is sent as an alternate to a paging message.

In accordance with the example embodiments as described in the paragraphs above, wherein the alternate application protocol paging message is based on a decoded radio resource control resume request and user equipment context stored at the apparatus and identifying the small data payload.

In accordance with the example embodiments as described in the paragraphs above, wherein messages comprising the application protocol paging message and the user equipment context release configuration are identified independently or asynchronously.

In accordance with the example embodiments as described in the paragraphs above, wherein the network device is caused to consolidate the messages.

A non-transitory computer-readable medium (MEM 12B and/or MEM 13B as in FIG. 2) storing program code (PROG 12C and/or PROG 13C as in FIG. 2), the program code executed by at least one processor (DP 12A and/or DP 13A as in FIG. 2) to perform the operations as at least described in the paragraphs above.

In accordance with an example embodiment of the invention as described above there is an apparatus comprising: means for receiving (one or more transceivers 12D and/or 13D; MEM 12B and/or MEM 13B; PROG 12C and/or PROG 13C; and DP 12A and/or DP 13A as in FIG. 2), by a network node central unit control plane (NN 12 and/or NN 13 as in FIG. 2), information comprising an indication of a downlink data notification for a small data transmission, wherein the information comprises a quality of service flow identification for the small data transmission; means, based on the information, for identifying (one or more transceivers 12D and/or 13D; MEM 12B and/or MEM 13B; PROG 12C and/or PROG 13C; and DP 12A and/or DP 13A as in FIG. 2) that the downlink data notification is for a small data transmission bearer user equipment; means, based on the identifying, for sending (one or more transceivers 12D and/or 13D; MEM 12B and/or MEM 13B; PROG 12C and/or PROG 13C; and DP 12A and/or DP 13A as in FIG. 2) towards a network node distributed unit associated with the user equipment an application protocol paging message comprising user equipment context setup request information, wherein the application protocol paging message causes a context setup for the user equipment as part of radio resource control resume message handling, wherein the user equipment context setup request information comprises an indication of the small data payload, wherein there is receiving from the user equipment a message 3 comprising a radio resource control resume request, wherein the quality of service flow identification is mapped to a stored data radio bearer identification to identify it is for small data transmission by the user equipment; and means, based on the context setup, for initiating (one or more transceivers 12D and/or 13D; MEM 12B and/or MEM 13B; PROG 12C and/or PROG 13C; and DP 12A and/or DP 13A as in FIG. 2) a radio resource control release using a user equipment context release configuration to release resources that are no longer needed, wherein based on the indication of the small data payload, a message 4 from the network node distributed unit to the small data transmission bearer for the small data transmission user equipment comprises information of both the small data payload and the radio resource control release.

In accordance with the example embodiments as described in the paragraph above, at least the means for receiving, identifying, sending, and initiating comprises a network interface (one or more transceivers 12D and/or 13D as in FIG. 2), and computer program code (PROG 12C and/or PROG 13C as in FIG. 2) stored on a computer-readable medium (MEM 12B and/or MEM 13B) as in FIG. 2 and executed by at least one processor (DP 12A and/or DP 13A as in FIG. 2).

FIG. 3B illustrates operations which may be performed by a network device such as, but not limited to, a network node NN 12 and/or NN 13 as in FIG. 2 or a network node distributed unit or an eNB or gNB. As shown in step 350 of FIG. 3B there is receiving, by a network node distributed unit from a network node central unit control plane an application protocol paging message comprising user equipment context setup request information. As shown in step 355 of FIG. 3B, wherein the application protocol paging message causes a context setup for user equipment as part of radio resource control resume message handling. As shown in step 360 of FIG. 3B, wherein the user equipment context setup request information comprises an indication of a small data payload for a small data transmission bearer user equipment associated with the network node distributed unit. As shown in step 365 of FIG. 3B, wherein a radio resource control release using a user equipment context release configuration has released resources that are no longer needed based on the context setup. As shown in step 368 of FIG. 3B wherein the quality of service flow identification is mapped to a stored data radio bearer identification to identify it is for small data transmission by the user equipment. Then as shown in step 370 of FIG. 3B there is, based on the indication of the small data payload, sending towards the small data transmission bearer user equipment a message 4 for the small data transmission comprising information of both the small data payload and the radio resource control release.

In accordance with the example embodiments as described in the paragraph above, wherein the application protocol paging message is received in response to information sent to the network node central unit control plane comprising an indication of a downlink data notification for a small data transmission.

In accordance with the example embodiments as described in the paragraphs above wherein based on identifying that the downlink data notification is for the small data transmission bearer user equipment the application protocol paging message is received as an alternate to a paging message.

In accordance with the example embodiments as described in the paragraphs above, wherein the alternate application protocol paging message is based on a decoded radio resource control resume request and user equipment context stored at the apparatus and identifying the small data payload.

In accordance with the example embodiments as described in the paragraphs above, wherein messages comprising the application protocol paging message and the user equipment context release configuration are identified independently or asynchronously.

In accordance with the example embodiments as described in the paragraphs above, wherein the network device is caused to consolidate the messages.

A non-transitory computer-readable medium (MEM 12B and/or MEM 13B as in FIG. 2) storing program code (PROG 12C and/or PROG 13C as in FIG. 2), the program code executed by at least one processor (DP 12A and/or DP 13A as in FIG. 2) to perform the operations as at least described in the paragraphs above.

In accordance with an example embodiment of the invention as described above there is an apparatus comprising: means for receiving (one or more transceivers 12D and/or 13D; MEM 12B and/or MEM 13B; PROG 12C and/or PROG 13C; and DP 12A and/or DP 13A as in FIG. 2), by a network node distributed unit (NN 12 and/or NN 13 as in FIG. 2) from a network node central unit control plane (NN 12 and/or NN 13 as in FIG. 2) an application protocol paging message comprising user equipment context setup request information, wherein the application protocol paging message causes a context setup for user equipment as part of radio resource control resume message handling, wherein the user equipment context setup request information comprises an indication of a small data payload for a small data transmission bearer user equipment associated with the network node distributed unit, and wherein a radio resource control release using a user equipment context release configuration has released resources that are no longer needed based on the context setup; and means, based on the indication of the small data payload, for sending (one or more transceivers 12D and/or 13D; MEM 12B and/or MEM 13B; PROG 12C and/or PROG 13C; and DP 12A and/or DP 13A as in FIG. 2) towards the small data transmission bearer user equipment a message 4 for the small data transmission comprising information of both the small data payload and the radio resource control release.

In accordance with the example embodiments as described in the paragraph above, at least the means for receiving and sending comprises a network interface (one or more transceivers 12D and/or 13D as in FIG. 2), and computer program code (PROG 12C and/or PROG 13C as in FIG. 2) stored on a computer-readable medium (MEM 12B and/or MEM 13B) as in FIG. 2 and executed by at least one processor (DP 12A and/or DP 13A as in FIG. 2).

A communication system comprising the network node central unit control plane apparatus or an eNB or gNB and the network node distributed unit apparatus or an eNB or gNB performing operations as described above.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory including computer program code, where the at least one non-transitory memory and the computer program code are configured, with the at least one processor, to cause the apparatus to at least:
   receive, by a network node central unit control plane, information comprising an indication of a downlink data notification for a small data transmission (SDT), wherein the information comprises a quality-of-service (QoS) flow identification for the SDT,
   based on the information, identify that the downlink data notification is for a SDT user equipment, wherein the QoS flow identification is mapped to a stored data radio bearer identification to identify that the downlink data notification is for the SDT user equipment,
   based on the identifying, send towards a network node distributed unit associated with the SDT user equipment an application protocol paging message, wherein the application protocol paging message causes a context setup for the SDT user equipment as part of radio resource control resume message handling,
   transmit, to the network node distributed unit associated with the SDT user equipment, user equipment context setup request information comprising an indication of a small data payload of the SDT transmission, the indication of the small data payload causing a message 4 of a random access procedure from the network node distributed unit to the SDT user equipment to comprise information of both the small data payload and a radio resource control release, wherein the radio resource control release comprises a user equipment context release configuration to release resources that are no longer needed based on the context setup.

2. The apparatus of claim 1, wherein the SDT user equipment is moved to a radio resource control inactive state by the network node central unit control plane.

3. The apparatus of claim 1, wherein the information comprising the indication of the downlink data notification is received from a network node central unit user plane of a communication network.

4. The apparatus of claim 1, wherein the network node central unit control plane is mapping the QoS flow identification to stored data radio bearer identifications to identify that the downlink data notification is for a SDT user equipment.

5. The apparatus of claim 1, wherein the application protocol paging message is based on a decoded radio resource control resume request and user equipment context stored at the apparatus and identifying the small data payload.

6. The apparatus of claim 1, wherein the apparatus is caused to indicate that the application protocol paging message is for SDT data.

7. A method, comprising:
   receiving, by a network node central unit control plane, information comprising an indication of a downlink data notification for a small data transmission (SDT), wherein the information comprises a quality-of-service (QoS) flow identification for the SDT;
   based on the information, identifying that the downlink data notification is for a SDT user equipment, wherein the QoS flow identification is mapped to a stored data radio bearer identification to identify that the downlink data notification is for the SDT user equipment;

based on the identifying, sending towards a network node distributed unit associated with the SDT user equipment an application protocol paging message, wherein the application protocol paging message causes a context setup for the SDT user equipment as part of radio resource control resume message handling;

transmitting, to the network node distributed unit associated with the SDT user equipment, user equipment context setup request information comprising an indication of a small data payload of the SDT transmission, the indication of the small data payload causing a message 4 of a random access procedure from the network node distributed unit to the SDT user equipment to comprise information of both the small data payload indication and the radio resource control release, wherein the radio resource control release comprises a user equipment context release configuration to release resources that are no longer needed based on the context setup.

8. The method of claim 7, wherein the SDT user equipment is moved to a radio resource control inactive state by the network node central unit control plane.

9. The method of claim 7, wherein the information comprising the indication of the downlink data notification is received from a network node central unit user plane of a communication network.

10. The method of claim 7, wherein the network node central unit control plane is mapping the QoS flow identification to stored data radio bearer identifications to identify that the downlink data notification is for a SDT user equipment.

11. The method of claim 7, wherein the application protocol paging message is based on a decoded radio resource control resume request and user equipment context stored at the network node central unit control plane and identifying the small data payload.

12. The method of claim 7, the method further comprising indicating that the application protocol paging message is for SDT data.

13. An apparatus comprising:
at least one processor; and
at least one non-transitory memory including computer program code, where the at least one non-transitory memory and the computer program code are configured, with the at least one processor, to cause the apparatus to at least:
receive, by a network node distributed unit from a network node central unit control plane an application protocol paging message, wherein the application protocol paging message causes a context setup for user equipment as part of radio resource control resume message handling,
trigger paging,
based on the paging, receive a message 3 of a random access procedure from a user equipment,
receive user equipment context setup request information from the network node central unit control plane, wherein the user equipment context setup request information comprises an indication of a small data payload for a small data transmission (SDT) user equipment associated with the network node distributed unit, and
based on the indication of the small data payload, send towards the SDT user equipment a message 4 of the random access procedure comprising information of both the small data payload and a radio resource control release, wherein the radio resource control release comprises a user equipment context release configuration to release resources that are no longer needed based on the context setup.

14. The apparatus of claim 13, wherein messages comprising the information of the small data payload and the user equipment context release configuration are identified independently or asynchronously, and wherein the at least one non-transitory memory including computer program code is configured with the at least one processor to cause the apparatus to consolidate the messages.

* * * * *